(12) United States Patent
Duncan et al.

(10) Patent No.: US 8,068,124 B2
(45) Date of Patent: Nov. 29, 2011

(54) COMPUTING DEVICE ENTERTAINMENT MODE SYSTEM AND METHOD

(75) Inventors: Cameron C. Duncan, Tomball, TX (US); Brittany Davis, Houston, TX (US); Kevin L. Massaro, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 695 days.

(21) Appl. No.: 11/799,402

(22) Filed: Apr. 30, 2007

(65) Prior Publication Data

US 2008/0266311 A1 Oct. 30, 2008

(51) Int. Cl.
*G09G 5/10* (2006.01)
(52) U.S. Cl. ........ 345/690; 345/170; 345/589; 715/718; 200/310; 340/815.4
(58) Field of Classification Search .................. None
See application file for complete search history.

(56) References Cited

U.S. PATENT DOCUMENTS

| | | | |
|---|---|---|---|
| 4,029,991 A | 6/1977 | Schultz | |
| 4,893,120 A | 1/1990 | Doering et al. | |
| 5,936,554 A | 8/1999 | Stanek | |
| 6,069,449 A | 5/2000 | Murakami | |
| 6,198,234 B1 | 3/2001 | Henry | |
| 6,307,765 B1 | 10/2001 | Choi | |
| 6,680,844 B2 | 1/2004 | Kim | |
| 6,967,647 B2 | 11/2005 | Nokiyama | |
| 7,117,019 B2 | 10/2006 | Abbasi | |
| 7,144,136 B2 | 12/2006 | Drader et al. | |
| 7,372,371 B2 * | 5/2008 | Bear et al. ................. | 340/815.4 |
| 7,562,242 B2 * | 7/2009 | Hori .............................. | 713/324 |
| 7,636,748 B2 * | 12/2009 | Duarte et al. ................. | 709/201 |
| 2004/0222977 A1 | 11/2004 | Bear et al. | |
| 2004/0222978 A1 | 11/2004 | Bear | |
| 2005/0264702 A1 | 12/2005 | Yoshii | |
| 2006/0158446 A1 * | 7/2006 | Gong et al. .................... | 345/211 |
| 2008/0054821 A1 * | 3/2008 | Busby ........................... | 315/291 |

FOREIGN PATENT DOCUMENTS

| | | |
|---|---|---|
| CN | 1316847 A | 10/2001 |
| JP | 2005128712 A | 5/2005 |

OTHER PUBLICATIONS

Patent Cooperation Treaty (PCT) International Search Report and Written Opinion of the International Searching Authority from co-pending PCT International Application No. PCT/US2008/005377, International Filing Date Apr. 25, 2008; having a date of mailing of Sep. 24, 2008.
Translation into English of Office Action issued by Patent Office of Germany. Mail Date Feb. 26, 2010. German Patent Application No. 11 2008 000 995.3-53.
UK Intellectual Property Office, Examination Report under Section 18(3), Appln No. 0919446.5, date of mailing Apr. 6, 2011, pp. 2.
Intellectual Property Office, Examination Report under Section 18(3), Appln No. 0919446.5, date of mailing Jul. 1, 2001, 7 p.

* cited by examiner

*Primary Examiner* — Antonio Caschera

(57) ABSTRACT

A computing device entertainment mode system comprises a computing device comprising at least one indicator element disposed thereon, the computing device configured to be placed into an entertainment mode of operation such that, in response to being placed in the entertainment mode of operation, an illumination intensity level associated with the at least one indicator element is automatically decreased.

20 Claims, 1 Drawing Sheet

COMPUTING DEVICE ENTERTAINMENT MODE SYSTEM AND METHOD

BACKGROUND

Exterior surfaces of computing devices, such as laptop or notebook computers, generally comprise one or more illuminated control buttons and/or indicators. For example, some computing devices comprise illuminated media player input buttons to control compact disk (CD) and/or digital video disk (DVD) functions such as a play button, a skip button, a pause button, a volume control button, etc. However, when the computing device is utilized in dark environments, such as during a meeting or presentation in a darkened room, the light emitted from the control buttons and/or indicators is distracting to the user of the computing device and/or others.

DETAILED DESCRIPTION OF THE DRAWINGS

Figure 1:
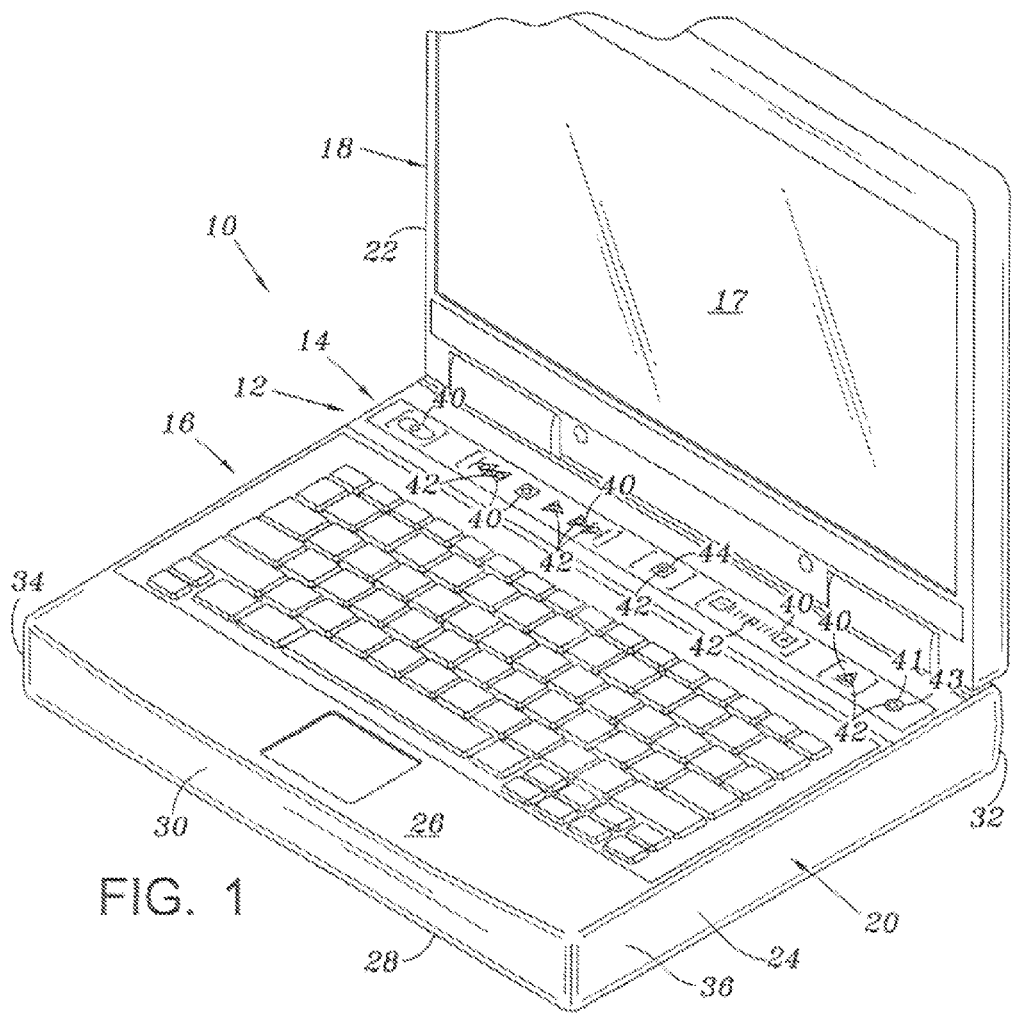
FIG. 1 is a diagram illustrating a computing device in which an entertainment mode system is employed to advantage.
Figure 2:
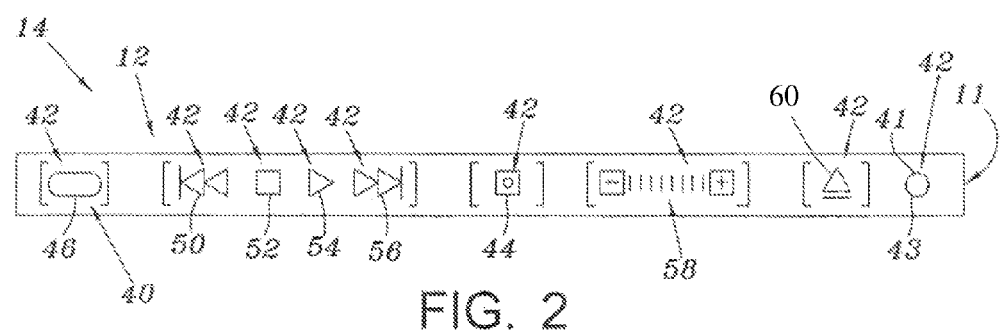
FIG. 2 is a diagram illustrating a control panel of the entertainment mode system of FIG. 1.

Various embodiments and the advantages thereof are best understood by referring to FIGS. 1 and 2, like numerals being used for like and corresponding parts of the various drawings.

FIG. 1 is a diagram illustrating a computing device 10 in which an embodiment of an entertainment mode system 14 is employed to advantage. In the embodiment illustrated in FIG. 1, computing device 10 comprises at least one control panel 11 having a plurality of indicator elements 12. Indicator elements 12 may be in the form of depressable buttons, touch-sensitive surfaces or otherwise that are used to control a particular function of computing device 10 and/or provide status information associated with a particular feature or function of computing device 10. It should be understood that indicator elements 12 may also be located elsewhere on computing device 10 (e.g., at locations other than and/or in addition to control panel 11).

In the embodiment illustrated in FIG. 1, computing device 10 comprises a laptop or notebook computer 16; however, it should be understood that computing device 10 may comprise any type of computing device such as, but not limited to, a tablet personal computer, a personal digital assistant, a desktop computer, a gaming device, or any other type of portable or non-portable computing device. In the embodiment illustrated in FIG. 1, computing device 10 comprises a display member 18 having a display screen 17 rotatably coupled to a base member 20. Display member 18 and base member 20 each comprise a housing 22 and 24, respectively, formed having a number of walls. For example, housing 24 comprises a top wall defining a working surface 26, a bottom wall 28, a front wall 30, a rear wall 32 and a pair of sidewalls 34 and 36.

In the embodiment illustrated in FIG. 1, indicator elements 12 comprise one or more control elements 40 and/or condition elements 41. In the embodiment illustrated in FIG. 1, control panel 11 and/or indicator elements 12 are disposed on working surface 26, although it should be understood that indicator elements 12 may be otherwise located (e.g., disposed on bottom wall 28, front wall 30, rear wall 32 or sidewalls 34 and 36, on display member 18, or any combination thereof). According to some embodiments, control element(s) 40 are used to control and/or otherwise facilitate the receipt of control input for computing device 10. Condition element(s) 41 are used to indicate to a user a particular condition of computing device 10 (e.g., whether computing device 10 is powered on, whether the caps lock function is enabled, etc.). It should be understood that additional control elements 40 and/or condition elements 41 may be used in connection with computing device 10.

In some embodiments, indicator elements 12 are illuminated using light emitting diodes (LEDs) 42 or otherwise to facilitate use and/or identification thereof by a user of computing device 10. In some embodiments, an "entertainment mode" of operation of computing device 10 comprises a mode of operation when computing device 10 is used to display movies, stream video content, display photographs, or used in any other fashion outputting entertainment-related content. Embodiments of system 14 enable a user of computing device 10 to select an entertainment mode of operation of computing device 10 and/or otherwise cause computing device 10 to enter an entertainment mode of operation such that illumination of all or some of indicator elements 12 are automatically turned off or reduced by some level. Accordingly, when computing device 10 is used in an entertainment mode of operation, the emitted light from one or more indicator elements 12 is eliminated and/or otherwise reduced to substantially reduce and/or eliminate distractions from the presentation of entertainment-related content by computing device 10, especially when computing device 10 is utilized in dark and/or low light environments.

FIG. 2 is a diagram illustrating control panel 11 of entertainment mode system 14 of FIG. 1. In the embodiment illustrated in FIGS. 1 and 2, condition element 41 comprises a power element 43 to indicate whether computing device 10 is powered on, and control elements 40 comprise a power button 46, a previous button 50, a stop button 52, a play button 54, a next button 56, volume control buttons 58 and an eject button 60 for operating a digital video disk (DVD) drive installed in computing device 10. It should be understood, however, that a single element 12 can be used as a control element 40 and as a condition element 41 (e.g., power on button used to turn on/off computing device 10 also has a light-indicating element indicating that the computing device 10 is powered on). It should also be understood that indicator elements 12 may be associated with additional or alternative functions.

In the embodiment illustrated in FIGS. 1 and 2, each LED 42 of indicator element 12 is configured to emit light to enable a user to locate and identify each indicator element 12. It should be understood that multiple indicator elements 12 may be illuminated by a single light source (e.g., a single LED 42 with a light pipe extending to different indicator elements 12 to illuminate such elements 12). Furthermore, it should be understood that indicator elements 12 may be illuminated by sources of light other than LEDs 42. In FIGS. 1 and 2, system 14 comprises a user-actuatable entertainment mode switch 44 to place computing device 10 into the entertainment mode of operation. For example, in some embodiments, in response to being placed in the entertainment mode of operation in response to actuation of switch 44, light emitted by one or more elements 40 and 41 is turned off or decreased/diminished in intensity either gradually or abruptly. Accordingly, system 14 is utilized to reduce and/or eliminate an amount of light emitted from elements 40 and 41, which may otherwise be a distraction when computing device 10 is utilized in dark and/or low light conditions.

In some embodiments, switch 44 may comprise a depressable button, a touch sensitive pad and/or any other mechanism (s) to enable actuation of switch 44. In the embodiment illustrated in FIGS. 1 and 2, switch 44 comprises an LED 42 to enable a user to locate and actuate system 14 when computing device 10 is operated in dark and/or low lit environments. When in the entertainment mode of operation (e.g., upon actuation of switch 44), light emitted by one or more elements 12 is automatically decreased (dimmed or turned off). In some embodiments, actuation of switch 44 again takes computing device 10 out of the entertainment mode of operation, thereby automatically increasing the light emitted from elements 12 and/or otherwise returning to a previous state of operation. The decreasing and/or increasing of light intensity may be gradual or abrupt. Thus, for example, when computing device 10 is in the entertainment mode of operation and it is desired to increase the volume of computing device 10, switch 44 can be actuated to increase the intensity of the indicator elements 12 in order to enable a user to locate volume control button 58. It should be understood that the light intensity of one or more elements 12 may be partially or incrementally increased or decreased upon actuating switch 44 such that actuation of switch 44 does not take computing device 10 completely out of the entertainment mode of operation. For example, system 14 may be configured such that upon actuation of switch 44, the light emitted from elements 12 incrementally increases/decreases in response to each successive actuation of switch 44 (e.g., fifty percent, twenty-five percent, etc. of a full intensity level). Additionally or alternatively, switch 44 may comprise a dial or other input device to enable a user to selectively vary the intensity of the light emitted from elements 12. In some embodiments, actuation of switch 44 may place computing device 10 into the entertainment mode of operation, or take computing device 10 out of the entertainment mode of operation, for a predetermined time period. For example, in some embodiments, when computing device 10 is in the entertainment mode of operation and it is desired to increase the volume of computing device 10, switch 44 can be actuated to increase the intensity of the indicator elements 12 for a short or timer-based duration in order to enable a user to locate volume control button 58. Thus, in this example, after expiration of the predetermined time period, computing device 10 is automatically returned to the entertainment mode of operation and the intensity of the light emitted from elements 12 is automatically decreased/diminished.

Furthermore, in addition to actuation of switch 44, a user can place computing device 10 in the entertainment mode of operation in a number of ways such as, for example, loading a DVD into a DVD player of computing device 10. Thus, in response to inserting a DVD into computing device 10 or computing device 10 otherwise detecting an entertainment-related event, system 14 may be configured to automatically enter the entertainment mode of operation and reduce the intensity of and/or turn of the light emitted from indicator element(s) 12 and automatically turn on or increase the intensity level when the DVD is finished playing.

According to some embodiments, switch 44 may continue to emit light to provide visibility of switch 44 while computing device 10 operates in an entertainment mode of operation. In such instances, LED 42 of switch 44 is configured to remain illuminated at a full or reduced intensity level (e.g., 50%, 25%, etc. of the full intensity) while other elements 12 are turned off and/or reduced in intensity to a level different than that of switch 44; however, it should be understood that the light emitted from switch 44 may be otherwise configured.

Thus, embodiments of system 14 enable one or more indicator elements 12 be dimmed and/or turned-off to reduce and/or eliminate bright or excessive light emitted from indicator element(s) 12 when electronic device 10 is placed in an entertainment mode of operation, thereby substantially reducing and/or eliminating, distracting conditions when using computing device 10 in low-lit areas when computing device 10 is operating in the entertainment mode.

What is claimed is:

1. A computing device comprising:
   at least one indicator element disposed thereon, the computing device to automatically enter into an entertainment mode of operation that displays at least one of a movie, a video content, and a photograph, in response to the computing device detecting an entertainment-related event, and
   a display screen;
   wherein an illumination intensity level associated with the at least one indicator element is automatically decreased in response to the computing device being placed in the entertainment mode of operation to reduce computing device based illumination not produced by the display screen.

2. The device of claim 1, wherein the intensity level of the at least one indicator element gradually decreases upon being placed in the entertainment mode of operation.

3. The device of claim 1, further comprising an entertainment mode switch actuatable by a user to place the computing device in the entertainment mode of operation.

4. The device of claim 3, wherein the entertainment mode switch is illuminated and remains illuminated in the entertainment mode of operation.

5. The device of claim 3, wherein, while in the entertainment mode of operation, the entertainment mode switch remains illuminated at an intensity level that is lower than an illumination intensity level of the entertainment mode switch while not in the entertainment mode of operation.

6. The device of claim 1, wherein the intensity level of the at least one indicator element increases in response to the computing device being taken out of the entertainment mode of operation.

7. The device of claim 1, wherein the intensity level of the at least one indicator element increases for a predetermined time period in response to the computing device being taken out of the entertainment mode of operation.

8. The computing device of claim 1, wherein the intensity level of the at least one indicator element incrementally increases in response to each actuation of an entertainment mode switch while in the entertainment mode of operation.

9. A method comprising:
   automatically entering into an entertainment mode of operation for a computing device that displays on a display screen of the computing device at least one of a movie, a video content, and a photograph in response to the computing device detecting an entertainment-related event; and
   reducing an illumination intensity level of at least one indicator element of the computing device in response to the computing device being placed into the entertainment mode of operation to reduce computing device based illumination not produced by the display screen;
   wherein the at least one indicator element is to illuminate a control input element of the computing device.

10. The method of claim 9, further comprising gradually reducing the intensity level of the at least one indicator element in response to the computing device being placed in the entertainment mode of operation.

11. The method of claim 9, further comprising automatically entering the entertainment mode in response to actuation of an entertainment mode switch.

12. The method of claim 11, further comprising illuminating the entertainment mode switch when the computing device is placed in the entertainment mode of operation.

13. The method of claim 11, further comprising illuminating, while in the entertainment mode of operation, the entertainment mode switch at an intensity level that is lower than an illumination intensity level of the entertainment mode switch while not in the entertainment mode of operation.

14. The method of claim 9, further comprising increasing the intensity level of the at least one illumination element in response to the computing device being taken out of the entertainment mode of operation.

15. The method of claim 9, further comprising:
increasing the intensity level of the at least one illumination element for a predetermined time period in response to actuation of an entertainment mode switch, and
restoring, responsive to expiration of the predetermined time period, the intensity level of the at least one illumination element to the level prior to the actuation.

16. The method of claim 9, further comprising increasing the intensity level of an indicator element illuminating a volume control element in response to actuation of an entertainment mode switch while in the entertainment mode of operation.

17. A computing device, comprising:
a means for computing comprising at least one means for indicating disposed thereon to illuminate a control input element of the computing device, the computing means configured to automatically be placed into an entertainment mode of operation that displays on a display screen of the computing device at least one of a movie, a video content, and a photograph in response to the computing device detecting an entertainment-related event such that, in response to being placed in the entertainment mode of operation, an illumination intensity level associated with the at least one indicating means is automatically decreased to reduce computing device based illumination not produced by the display screen.

18. The device of claim 17, wherein the intensity level of the at least one indicating means gradually decreases in response to the computing means being placed in the entertainment mode of operation.

19. The device of claim 17, further comprising a means for placing the computing means in an entertainment mode of operation by a user.

20. The device of claim 19, wherein the means for placing the computing means in the entertainment mode of operation is illuminated and remains illuminated in the entertainment mode of operation.

* * * * *